United States Patent [19]
Hostetler

[11] 3,896,956
[45] July 29, 1975

[54] ROUND BALE LOADER FOR PICKUP TRUCK

[76] Inventor: Dewey L. Hostetler, R.R. 2, Box 4, Harper, Kans. 67058

[22] Filed: Dec. 12, 1973

[21] Appl. No.: 426,645

[52] U.S. Cl. ............... 214/501; 214/78; 214/130 C; 214/DIG. 3; 214/DIG. 4
[51] Int. Cl. ............................................. B60p 1/16
[58] Field of Search........... 214/78, 501, 505, 77 R, 214/DIG. 3, DIG. 4, 502, 130 C, 130 A

[56] References Cited
UNITED STATES PATENTS

| | | | |
|---|---|---|---|
| 867,662 | 10/1907 | Kemp | 214/77 R |
| 2,726,115 | 12/1955 | Babcock et al. | 214/501 |
| 2,790,564 | 4/1957 | Rockwell | 214/78 |
| 3,357,580 | 12/1967 | Schettler et al. | 214/501 |
| 3,376,987 | 4/1968 | Lohse | 214/505 |
| 3,412,882 | 11/1968 | Stockwell | 214/501 |

FOREIGN PATENTS OR APPLICATIONS

| | | | |
|---|---|---|---|
| 1,756,328 | 3/1970 | Germany | 214/501 |

Primary Examiner—Robert J. Spar
Assistant Examiner—Gary Auton
Attorney, Agent, or Firm—John H. Widdowson

[57] ABSTRACT

A cylindrical bale loader for a truck has a frame pivotally mountable on the bed portion. It is pivoted in use from the vertical at the rear of the bed to the horizontal overlying the bed. The frame in one end portion receives a cylindrical bale in lifting position, and in the other end portion holds and retains the cylindrical bale when the frame overlies the bed of the truck.

8 Claims, 6 Drawing Figures

ROUND BALE LOADER FOR PICKUP TRUCK

BACKGROUND OF THE INVENTION

The invention is related to loader apparatuses mountable on a truck bed and usable for picking up generally cylindrical bales of hay or the like in the field, carrying them in a transport position on the truck for placement elsewhere. Many hay bale stacking and loading devices are known in the prior art for use in picking up, handling, stacking, carrying transporting and unloading rectangular bales of hay. The prior art hay bale handling devices are constructed to handle hay bales which are of a nominal size, approximately 18 inches in height, 24 inches in width and 4 to 6 feet in length, and vary in weight from approximately 80 pounds to 130 pounds. These prior art devices are not adapted for handling larger cylindrical bales of hay, particularly those which are approximately 6 feet in diameter, 5 feet in length and weight approximately 1800 pounds. The prior art apparatus for picking up hay bales in the field include chute and elevator type devices for picking up the bale on the ground into raising it to an elevated position where it can be moved by hand into a stack on the bed of a truck or trailer. Other prior art bale handling devices include pivotally mounted truck beds having fork or rack-like frame on one end portion therof with the truck bed pivotable to provide for placing the load of stacked bales as a block-like unit on the ground behind the truck bed for storage in a large block-like stack. Numerous types of fork lift loaders are known in the prior art for the raising and transporting of loads; however, of these structures, those which are mountable with a vehicle bed, such as a truck bed, function only to engage a load with the fork portion of the device and raise the load to a slightly elevated position and tilt the fork slightly to prevent the load from slipping off of the forks. These prior art fork lift attachments and the like are not particularly well suited for the handling of cylindrical hay bales as they are not structurally equipped to hold or retain the hay bale in position once it has been engaged.

SUMMARY OF THE INVENTION

In one preferred specific embodiment, a loader apparatus structure includes a first frame mountable on the bed portion of a truck or other vehicle and a second frame pivotally mounted on the first frame with a fork on one end portion thereof and a load retainer structure on the opposite end thereof and on opposed sides thereof. An apparatus to pivot the first frame relative to the second frame with the second frame movable between one position with the fork adjacent to ground level and a second position with the second frame positioned generally above the first frame. The loader apparatus in use can pick up a generally cylindrical bale of hay or the like when in the first described position and transport the bale of hay in the second described position. While in the transport position or second position the load retainer structure retains or holds the bale in position on the second frame generally above the vehicle bed. The hay bale can be placed where desired by pivoting the second frame into the first described position from the second position which places the hay bale on the ground.

One object of this invention is to provide a loader structure overcoming the aforementioned disadvantages of the prior art devices.

Another object of this invention is to provide a powered loader apparatus adapted for the handling and transportation of generally cylindrical bales of hay which are presently normally approximately 5 feet in length, 6 feet in diameter and weigh approximately 1800 pounds with the loader adapted for mounting on the bed of a pickup truck or the like.

Still, another object of this invention is to provide a powered and remotely controllable loader apparatus mountable in the bed of a pickup truck which is operable for picking up, transporting and placing a large generally cylindrical bale of hay wherein the hay bale when loaded on the apparatus in the truck bed is centrally positioned on the truck for uniform weight distribution.

Still, another object of this invention is to provide a round bale hay loader for a pickup truck which has a frame mountable and bed of the pickup truck and the second frame pivotally mounted with the first frame having a fork positionable at ground level to engage a cylindrical bale of hay and having a rack-like load retainer structure to retain the hay bale on the second frame when the second frame is pivoted to a transport generally above the first frame and the bed of the truck and also to guide the hay bale when the second frame is pivoted from the elevated transport position to a lowered position for placing the hay bale on the ground.

Various other objects, advantages and features of the invention will become apparent to those skilled in the art from the following discussion, taken in conjunction with the accompanying drawings, in which:

Figure 1:
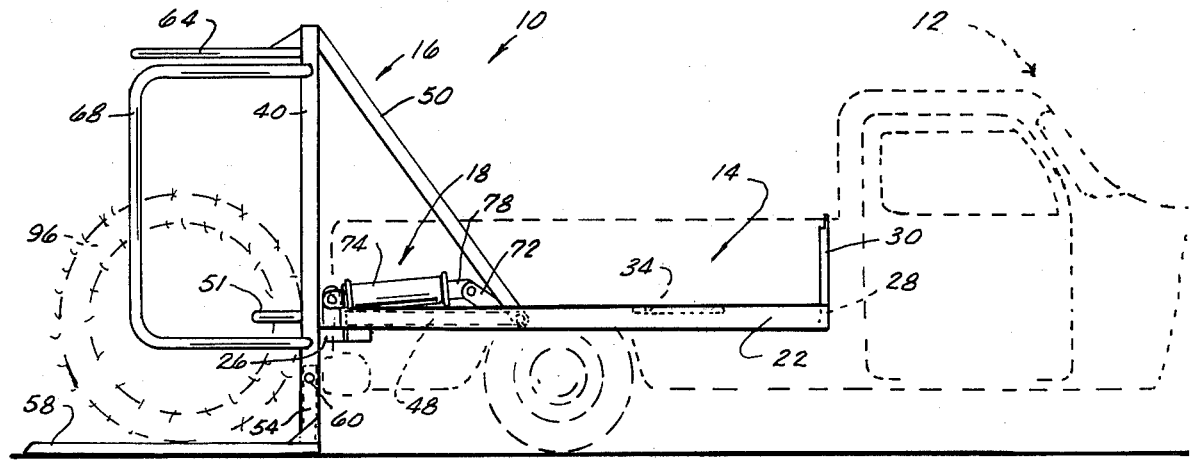
FIG. 1 is a side elevation view of the loader mounted on the bed of a pickup truck wherein the fork portion of the frame is on the ground with a bale of hay positioned therein, the pickup truck and bale of hay being shown in dashed lines.

The following is a discussion and description of preferred specific embodiments of the round bale loader for pickup truck of this invention, such being made with reference to the drawings, whereupon the same reference numerals are used to indicate the same or similar parts and/or structures. It is to be understood that such discussion and description is not to unduly limit the scope of the invention.

DESCRIPTION OF PREFERRED EMBODIMENTS

Referring to the drawings in detail and in particular to FIG. 1, the loader apparatus of this invention is indicated generally at 10 and shown mounted on the bed portion of a pickup truck that is shown in dashed lines and generally indicated at 12. The loader apparatus includes a first frame portion, indicated generally at 14 mounted in the bed of the truck 12 and a pivotally mounted second frame portion, indicated generally at 16, for engaging and retaining or holding a bale of hay.

A powering apparatus, indicated generally at 18, is connected between the first frame 14 and the second frame 16 for pivoting the second frame 16 relative to the first frame 14. The loader apparatus is pivotable between a first position shown in FIGS. 1–3 and a second position shown in FIGS. 4 and 5.

Figure 2:
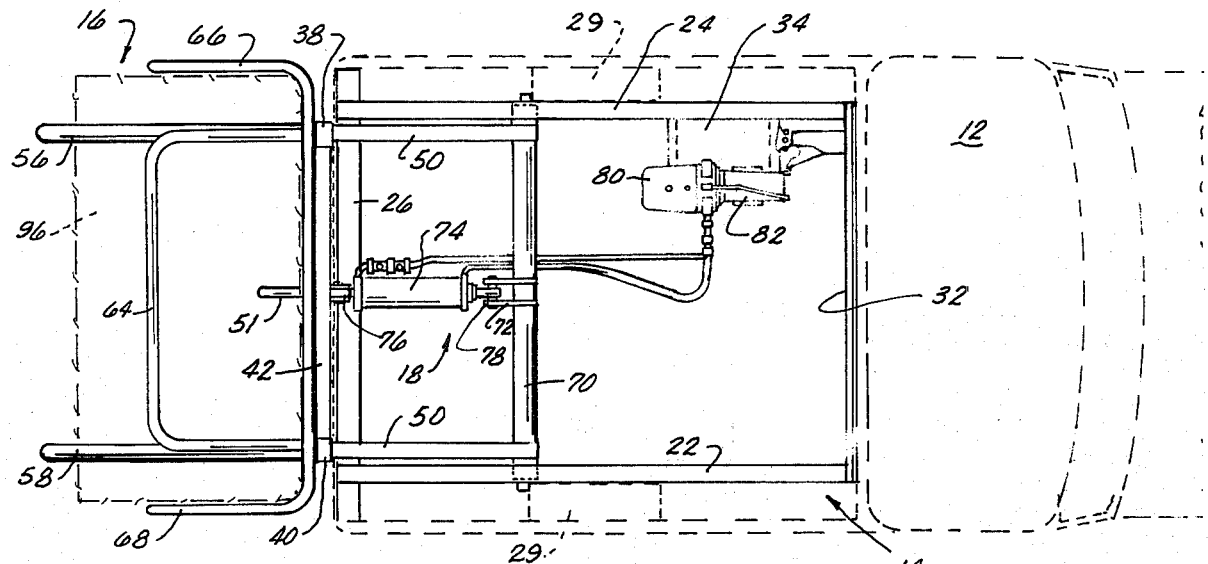
FIG. 2 is a top plan view of the loader, pickup truck and hay bale shown in FIG. 1.
Figure 4:
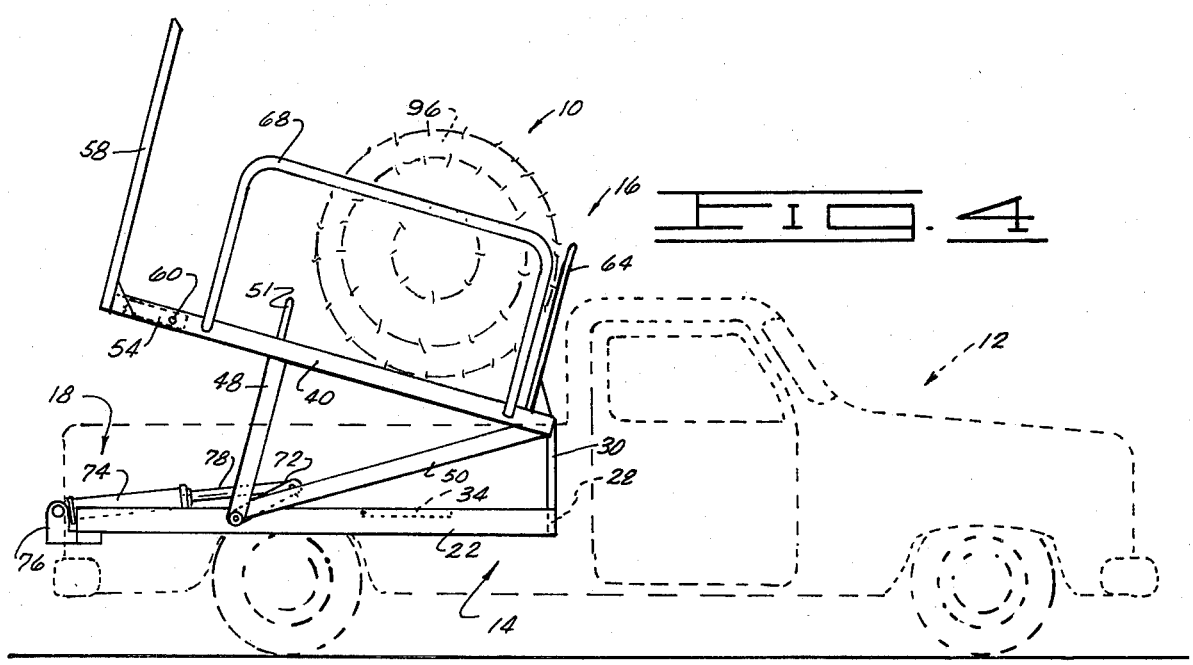
FIG. 4 is a side elevation view of the loader, pickup truck and hay bale shown in FIG. 1 with the loader and hay bale positioned in a transport position.

The first frame portion 14 of the loader apparatus has a rectangular structure mountable on the floor of the bed of a pickup truck or other vehicle having a generally similar bed structure. The first frame portion 14 includes elongated side members 22 and 24, a rear member 26 and a forward member 28. Spacing of the side members 22 and 24 preferably is such that the first frame 14 will slip between the wheel wells 29 of the pickup's truck bed portion as shown in FIG. 2. The forward end portion of the first frame 14 has uprights 30 extending upward from the side members 22 and 24 with the uprights being connected to a transverse member 32. The transverse member 32 forms a stop for limiting the pivotal motion of the second frame 16 is illustrated in FIG. 4. A mount 34 is attached to the side member 24 for supporting the motor and hydraulic pump of the powering device 18 as will be described hereinafter.

The second frame 16 has a rectangular frame structure mounting a loading engaging fork and a load retaining structure. The second frame 16 is mounted with the first frame 14 to pivot longitudinally with respect thereto. The second frame 16 includes a generally rectangular frame-like structure with parallel sides 38 and 40 connected by transverse end members 42 and 44, a centrally positioned transverse member 46 and a longitudinal member 47 connected between the end member 42 and the cross member 46. The second frame side members 38 and 40 are parallel and extend beyond the center transverse member 46 with the fork portion of the structure attached to their outer end portions. The second frame 16 is mounted by a mount member 48 extending perpendicularly from the plane of the second frame 16 and a brace member 50 secured to the mount member 48 and sides 38 and 40 as shown. A bar 51 is secured to the transverse member 46 at the intersection of the longitudinal member 48 and it extends a short distance from the plane of the rectangular portion of the second frame 16. The bar 51 functions to penetrate the bale of hay when the loader 10 changes between the positions shown in FIGS. 1 and 2 to retard motion of the bale and to aid in retaining the bale in position. The fork portion of the second frame 16 includes a pair of collar members 52 and 54 mounted over the outer ends of the side members 38 and 40 and connected by the frame end member 44. fork tines 56 and 58 are secured to the collars 52 and 54, respectively. The collars 52 and 54 are preferably slidably mounted on the ends of the frame side members 38 and 40 and they are securable thereto by fasteners. The fastener on collar 54 is indicated at 60 and visible at FIGS. 1 and 4. Adjustment of the collar 52 and 54 is necessary to adjust the position of the fork and tines 56 and 58 relative to ground level. Preferably, the fork tines are positioned on the ground as shown in FIG. 1 for the loader 10 to properly pick up a bale of hay. The dimension between ground level and the pickup truck bed will vary between vehicles and the loader apparatus 10 must compensate for this factor.

The loader retainer or rack portion of the second frame 16 includes an end member 64 and side members 66 and 68 all secured to the frame sides 38 and 40. The rack or retainer end member 64 extends perpendicularly from the plane of the rectangular portion of the second frame 16 and it is preferably shaped as shown in the drawings. The rack or retainer sides 66 and 68 are secured to the outer side of the frame side members 38 and 40 extending outwardly therefrom in the plane of the side members 38 and 40 a short distance then extending generally perpendicular to the plane of the side members preferably as shown in the drawings. The width dimension of the side rack members 66 and 68 is such that the rack members 66 and 68 will pass between the inner sides of the pickup bed structure when the loader apparatus 10 is positioned with the forward portion of the second frame 16 between the sides of the bed. In the pickup truck and loader apparatus shown in the drawings the forward portion of the second frame 16, when tilted, is only slightly below the top of the truck bed sides. In some installations the forward portion of the second frame 16, when tilted, may be substantially below the top of the truck bed sides depending on the height of the truck bed sides and the height of the stop members 30 and 32. In the latter case it is necessary for the width of the rack to be narrower than the truck bed.

The mount portion of the second frame 16 has a pivotable transverse member 70 which is pivotally mounted between the first frame sides 22 and 24 in position transverse to the elongated axis of the truck bed and the first frame 14. The mount members 48 and brace members 50 on opposite sides of the second frame 16 are rigidly secured to the pivot transverse member 70. A yoke-like arm member 72 is secured to the center portion of the transverse pivotal member 70 and is coupled with the powering device 18 for use in pivoting the second frame 16 relative to the first frame 14.

Figure 5:
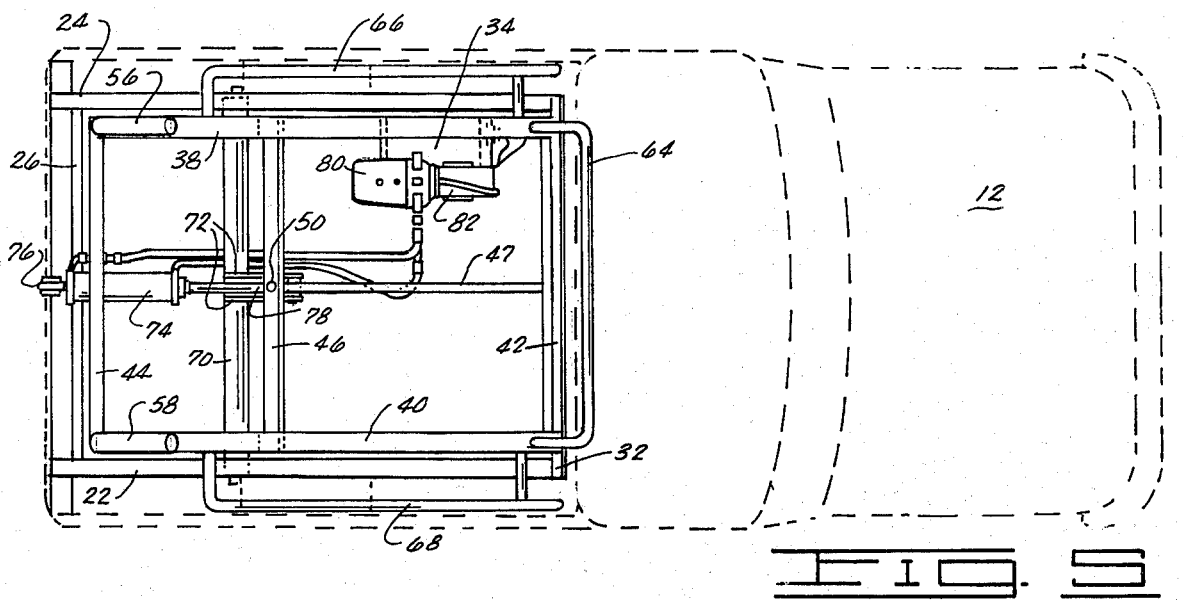
FIG. 5 is a top plan view of the loader and pickup shown in FIG. 4 with the loader.
Figure 6:
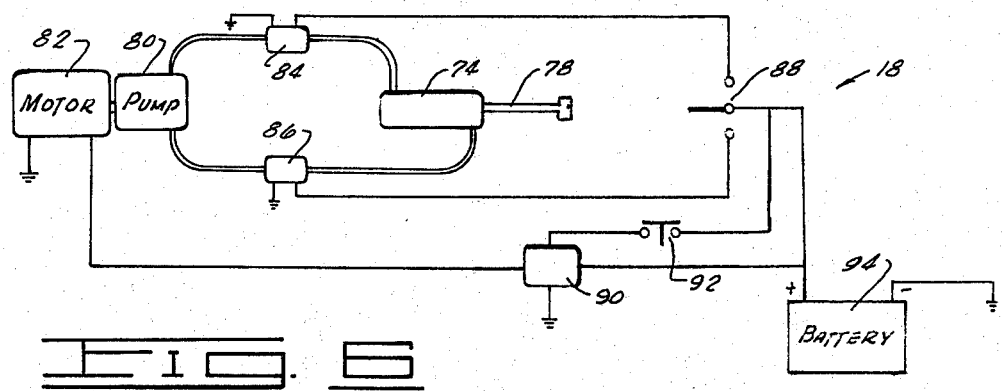
FIG. 6 is a schematic diagram of the electromechanical power and control system for the loader.

The powering device 16 preferably includes a hydraulic piston and cylinder apparatus mounted between the first frame 14 and the second frame 16 powered by an electric motor driven hydraulic pump apparatus that is operable from the electrical power system of the pickup truck 12. In the preferred powering device 18, the cylinder 74 of the piston cylinder apparatus supported by a mount 76 secured to the first frame end member 26 and the piston 78 is mounted with the yoke-like arm member 72 on the transverse pivotal member 70. Extension and retraction of the piston 78 will pivot the second frame 16 relative to the first frame 14 at the mounting of the pivotal transverse member 70. A hydraulic pump 80 is connected to the electric motor 82 and the apparatus is supported on the mount 34 of the first frame 14 as shown in FIGS. 2 and 5. The motor 82 is electrically connected with the electrical system of the pickup truck 12. A schematic diagram of the electromechanical power and control circuit for the loader 10 is shown in FIG. 6. The cylinder 74 is connected with the hydraulic pump 80 by a pair of solenoid actuated valves 84 and 86. The solenoids of the solenoid actuated valves 84 and 86 are connected with a selector switch 88 used to regulate opening and closing of the valves. A motor power control solenoid 90 is connected between the electric motor 82 and the battery or power source and it is controlled by a momentary contact on and off switch 92. Electrical power for operation of the electromechanical apparatus indicated in FIG. 6 for the loader is provided by the vehicles battery, indicated at 94. The batttery 94 (positive side) is connected as shown to the momentary contact on-off switch 92, the solenoid 90, and the selector switch 88 is shown so the solenoid 90 and the valve solenoids 84 and 86 and motor 82 are not energized until the on-off switch 92 is put in the "on" position. Depending upon the setting of the selector switch 88 either the solenoid valve 84 or 86 will be activated to extend or retract the piston 78 relative to the cylinder 74 for raising or lowering the second frame 16 of the loader apparatus 10.

Figure 3:
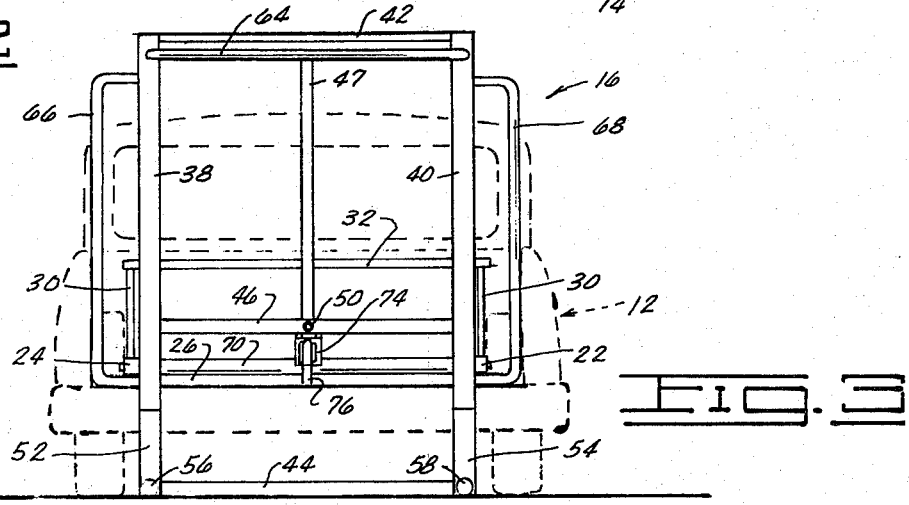
FIG. 3 is a rear end elevation view of the loader and pickup truck shown in FIG. 1.

In the use of the round bale loader apparatus 10 of this invention, the first frame portion thereof is mounted in the bed of a pickup truck or other vehicle having a generally similar bed structure and it is preferably attached by bolts. In practice in manufacturing the loader apparatus 10 of this invention, it has been found that mounting such by bolts on the bed of a pickup truck allows the apparatus to be easily removed from the pickup during periods when it is not needed. The sleeves 52 and 54 mounting the fork portion of the second frame 16 are adjusted so the tines 56 and 58 of the fork portion rest on the ground and behind the truck when the loader is positioned as shown in FIGS. 1-3. When it is desired to pick up a bale of hay lying in the field, the second frame 16 is positioned as shown in FIGS. 1-3 with the tines 56 and 58 of the fork portion on or essentially adjacent to ground level. The loader of this invention can be used to pick up a generally cylindrical bale when the bale is lying on its side or when it is sitting on its end. When used to pick up a bale lying on its side the pickup is positioned so the fork portion of the loader is essentially perpendicular to the elongated axis of the bale of hay, then the pickup is backed up so tines 56 and 58 pass underneath the bale of hay 96 and it is positioned as shown in FIGS. 1 and 2. When the bale of hay 96 is properly engaged in the rack portion of the second frame, the ends of the bale are between the rack sides 66 and 68 and the forwardmost portion of the bale of hay 96 contact the side members 38 and 40. It is to be noted that at this time the spike or barlike member 50 penetrates the bale of hay as shown in FIGS. 1 and 2. When the loader is used to pick up a bale resting on its end the tines 56 and 58 are positioned under the lower end of the bale by backing the truck into position so the forward portion of the bale contacts the frame and the bale is between the rack sides 66 and 68. When it is desired to raise or elevate the bale of hay 96 in the second frame 16, the selector switch 88 of the control circuit is placed to cause opening of the proper valves for extension of the hydrualic piston 78 when the pump motor 82 is operated. Operation of the electric motor 82 is controlled by the on-off switch 92. When the motor 82 and pump 80 are operated to extend the piston 78, the second frame 16 is pivoted with the transverse pivotal member 70 as the arm member 72 is pushed forward with the second frame 16 stopping at the load carrying position as shown in FIGS. 4 and 5. In this load carrying position the second frame transverse member 42 rests on the first frame transverse member 32 and the bale of hay 96 has rolled to the position shown in FIG. 4. As the bale of hay 96 rolls on the second frame 16 from the position shown in FIG. 1 to the position in FIG. 2, the spike or bar member 50 is withdrawn from the bale of hay which retards at its forward rate of motion. With the bale of hay 96 positioned on the loader 10 as shown in FIG. 4, the bale of hay is centrally located on the pickup truck 12 thereby providing for an essentially stable load carrying structure for the pickup as compared to loader apparatuses which provide for the carrying of a load on the tailgate or extreme rear portion of a pickup truck. In practice it has been found that the motor 82 of the powering device 18 can be efficiently operated by the 12-volt direct current electrical power system presently used in motor vehicles, such as the pickup 12.

The loader apparatus 10 has been constructed so the forwardly disposed portion of the second frame can be positioned below the sidewalls of the pickup bed and adjacent to the floor of the bed if desired, thus providing for a relatively low center of gravity considering the truck, load, and loading apparatus. It is to be noted that the round bale loader apparatus of this invention can be used on vehicles other than pickup trucks; for example, it can be used singularly on small trucks or in multiples on larger trucks or other larger transport vehicles, such as trailers, wagons and the like, in the event the loader apparatus of this invention is used on a vehicle such as a trailer, it would be necessary to contact the electrical circuit of the powering device 18 to an appropriate source of electrical power. Additionally, it is to be noted that although the powering device 18 includes an electrically driven hydrualic pump, such can be replaced by a hydraulic or pneumatic power source such as an auxiliary power source on a vehicle to operate the piston and cylinder apparatus.

In the manufacture of the round bale loader for the pickup truck of this invention, it is obvious that same can be easily constructed to achieve the end product. The frame structures of the loader apparatus are relatively simple in construction and obviously can be constructed to fit standard size pickup truck vehicles or other vehicles as desired. Obviously, if desired, the loader apparatus of this invention can be integrally constructed with a truck or the like which can, depending upon the design include or replace the described first frame portion. The use of a hydraulic piston and cylinder apparatus powered by an electric motor affords construction of the loader as a unit for easy mounting on and connecting with conventional pickup trucks which do not ordinarily have hydraulic auxiliary power units. The fork portion of the frame structure is made adjustable to provide for vertically positioning same as is required due to varying bed heights of different makes and models of pickups.

In the use and operation of the round bale loader for a pickup of this invention, it is seen that same provides a structurally simple device for picking up, transporting and placing large cylindrical bales of hay or the like. The loader apparatus is constructed so that it can be mounted on and removed from the bed portion of a pickup truck relatively easily. The loader is safe to use in that it positions the bale of hay in a central portion of the truck at the forward portion of the bed for uniform weight distribution desirable in transporting the large bales of hay. In operation of the powering device of the loader can be done by the driver of the truck with the controls for the powering device mounted in the cab of the truck.

As will become apparent from the foregoing description of the applicant's round bale loader for pickup trucks of this invention, a relatively inexpensive and simple apparatus has been provided to pick up, transport, and place large cylindrically shaped bales of hay.

The loader apparatus structure is economical to manufacture in that the two component frame-like structures thereof are relatively simple in design. The loader apparatus is simple to use in that only two control switches are needed for its operation and it can be operated in an efficient manner by the driver of the pickup truck from his seat in the cab of the truck.

While the invention has been described in conjunction with the preferred specific embodiments thereof, it will be understood that this description is intended to illustrate and not to limit the scope of the invention, which is defined by the following claims.

I Claim:

1. A cylindrical bale loader for a truck or the like, comprising:
   a. a frame means pivotally mountable on the bed portion of a truck or the like, said frame means having mounting means constructed and adapted to pivot said frame means when mounted on said bed portion from a generally vertical position at the rear portion of said bed portion to a generally forwardly tilted position overlying said bed portion,
   b. said frame means in one end portion having a fork portion extending therefrom, said fork portion being constructed and adapted to receive a cylindrical bale in lifting position with a portion of said fork portion underneath said bale,
   c. said loader has means connectable with said mounting means and said truck or the like to pivot said frame means,
   d. said means to pivot said frame means being a power means mounted on said bed portion and,
   e. the opposite end portion of said frame means having a bale retaining portion constructed and adapted to guide, hold and retain a cylindrical bale thereon as said bale rolls by gravity forwardly on said frame means when said frame means is moved from said vertical position to said forwardly tilted position or vice versa,
   said loader when said frame means is mounted on said bed portion of said truck is constructed and adapted to receive a cylindrical bale, lift same when said frame means is pivoted, and retain same on said frame means when said frame means is in said forwardly tilted position overlying said bed portion of said truck.

2. The loader of claim 1, wherein:
   a. said bale retaining portion has sides rigidly secured to said frame means and an end member rigidly secured to said frame means.

3. The loader of claim 2, wherein:
   a. said fork portion has a plurality of elongated tines,
   b. said sides are secured to opposite end portions of said frame means, and
   c. said end member is secured to said opposite end portion of said frame means.

4. The loader of claim 3, wherein:
   a. said powered means to pivot said frame means has a fluid activated piston and cylinder means,
   b. said frame means has opposed side members,
   c. said fork portion is mounted on one end portion of said opposed frame side members,
   d. said sides are secured to said opposed frame side members, and
   e. said end member is secured to the opposite end portion of said opposed frame side members.

5. A cylindrical bale loader for a truck or the like, comprising:
   a. a first frame means rigidly mountable on the bed portion of said truck or the like,
   b. a second frame means having mounting means constructed and adapted to pivot said frame means from a generally vertical position at the rear portion of said bed portion to a generally forwardly tilted portion overlying said bed portion,
   c. said second frame means has a fork portion on one end portion thereof constructed and adapted to receive a cylindrical bale in lifting position with a portion of said fork portion underneath the bale and a load retaining portion on the opposite end portion thereof constructed and adapted to guide, hold and retain a cylindrical bale on said second frame means as said bale rolls by gravity forwardly on said second frame means when said second frame means is moved from said vertical position to said forwardly tilted position or vice versa,
   d. means connected between said first frame means and said second frame means to pivot said second frame means relative to said first frame means,
   e. said means to pivot said first frame means relative to said second frame means has a power means to pivot said second frame means mounted on said first frame means.
   said loader when said frame means is mounted on said bed portion of said truck is constructed and adapted to receive a cylindrical bale, lift same when said second frame means is pivoted and retain same on said second frame means when said second frame means is in said forwardly tilted position overlying said bed portion of said truck.

6. The loader of claim 5, wherein:
   a. said second frame means has elongated side members on opposite sides thereof,
   b. said load retaining portion has side portions rigidly secured to said second frame side members, and
   c. said load retaining portion has an end portion rigidly secured to the end portion of said second frame means side members.

7. The loader of claim 6, wherein:
   said fork portion has a plurality of elongated tines.

8. The loader of claim 7, wherein:
   a. said plurality of tines are longitudinally adjustably mounted on said second frame means side members, and
   b. said powered means has a fluid actuatable piston and cylinder means.

* * * * *